United States Patent
Zhang et al.

(10) Patent No.: US 9,503,352 B1
(45) Date of Patent: Nov. 22, 2016

(54) ACCOUNTING FOR NETWORK TRAFFIC

(71) Applicant: Conviva Inc., San Mateo, CA (US)

(72) Inventors: Hui Zhang, Pittsburgh, PA (US); Ion Stoica, Piedmont, CA (US); Steven R. Mccanne, Berkeley, CA (US); Jibin Zhan, Foster City, CA (US); Aditya Ravikumar Ganjam, San Francisco, CA (US)

(73) Assignee: Conviva Inc., Foster City, CA (US)

( * ) Notice: Subject to any disclaimer, the term of this patent is extended or adjusted under 35 U.S.C. 154(b) by 0 days.

(21) Appl. No.: 14/703,679

(22) Filed: May 4, 2015

Related U.S. Application Data

(63) Continuation of application No. 14/263,909, filed on Apr. 28, 2014, now Pat. No. 9,088,633, which is a continuation of application No. 11/698,762, filed on Jan. 26, 2007, now Pat. No. 8,751,605.

(60) Provisional application No. 60/859,428, filed on Nov. 15, 2006.

(51) Int. Cl.
  *H04L 12/26*   (2006.01)
  *H04L 29/08*   (2006.01)
  *G06Q 40/00*   (2012.01)
  *H04L 29/06*   (2006.01)

(52) U.S. Cl.
  CPC ............ *H04L 43/16* (2013.01); *G06Q 40/12* (2013.12); *H04L 67/10* (2013.01); *H04L 65/60* (2013.01); *H04L 67/1063* (2013.01)

(58) Field of Classification Search
  CPC ... H04L 67/104; H04L 67/06; H04L 69/329; H04L 67/1063; H04L 12/5695; G06F 17/30206; G06F 17/30209; G06Q 30/04; G06Q 40/12; H04N 21/4621; H04N 21/47202; H04N 7/17318; H04N 21/25833; H04N 21/06
  See application file for complete search history.

(56) References Cited

U.S. PATENT DOCUMENTS

| | | | | |
|---|---|---|---|---|
| 6,026,077 A | * | 2/2000 | Iwata | H04L 45/04 340/2.23 |
| 6,754,833 B1 | * | 6/2004 | Black | G06F 21/41 713/169 |
| 7,020,082 B2 | * | 3/2006 | Bhagavath | H04L 12/2602 370/230 |
| 7,139,834 B1 | * | 11/2006 | Albanese | H04L 12/2602 709/217 |
| 7,373,415 B1 | * | 5/2008 | DeShan | H04L 12/2697 709/231 |
| 2002/0016831 A1 | * | 2/2002 | Peled | G06Q 30/0601 709/219 |
| 2003/0169863 A1 | * | 9/2003 | Hernandez | G06Q 30/04 379/114.01 |

* cited by examiner

*Primary Examiner* — Bunjob Jaroenchonwanit
(74) *Attorney, Agent, or Firm* — Van Pelt, Yi & James LLP

(57) ABSTRACT

Tracking distribution of content is disclosed. A path of a data transfer event associated with content distribution is discovered. The transfer path is predetermined at least in part by a third party and includes a plurality of network components. Information related to the data transfer event is associated with each of the plurality of network components. The information associated with each network component is recorded.

72 Claims, 9 Drawing Sheets

```
<component><path, owner of content, #bytes, start transfer, end transfer, title of content>
```
~ 502

```
<router104b4> <ge5-2.bas1-m.dcn.acme.com exchange-cust1.sv1.foo.net ge-0-1-0.gw.sr.example.com,
              MovieStudio, 30000, 00:01:59, 00:02:33, RobinHood>
```
~ 504

FIG. 5

=> all bytes that leave SP1 and enter SP2 during the hours of 18:00 and 00:00 ⁓ 702

=> all MovieStudio bytes that leave SP1 and enter SP2 ⁓ 704

=> All MovieStudio bytes that are delivered to SP1 subscribers ⁓ 706

=> Number of MovieStudio files received by a given client/endhost ⁓ 708

=> The difference between: ⁓ 710
SP1 -> SP2 bytes
SP2 -> SP1 bytes
During the last quarter

FIG. 7

ACCOUNTING FOR NETWORK TRAFFIC

CROSS REFERENCE TO OTHER APPLICATIONS

This application is a continuation of U.S. patent application Ser. No. 14/263,909, entitled ACCOUNTING FOR NETWORK TRAFFIC filed Apr. 28, 2014 which is incorporated herein by reference for all purposes, which is a continuation of U.S. patent application Ser. No. 11/698,762, entitled ACCOUNTING FOR NETWORK TRAFFIC filed Jan. 26, 2007, now U.S. Pat. No. 8,751,605, which is incorporated herein by reference for all purposes, which claims priority to U.S. Provisional Patent Application No. 60/859,428 entitled CONTENT DISTRIBUTION filed Nov. 15, 2006 which is incorporated herein by reference for all purposes.

BACKGROUND OF THE INVENTION

Users are increasingly using networks such as the Internet to access content, such as video files and live streaming/video on demand content, via client machines. Such content is often large, time sensitive, or both. As demand for such content increases, there are challenges in distributing that content efficiently and with high quality.

Two ways that content owners can distribute content are by using their own servers or buying the service of a content delivery network (CDN). In the later case, content owners typically contract with CDNs to provide content to clients, e.g., in exchange for a fee. Requests by clients for content are directed to CDN nodes that are close by, e.g., the fewest hops away from the clients. The client then downloads the content from the appropriate CDN node. In both cases, content is distributed by servers, owned by either the content owner directly or the CDN. Unfortunately, as demand on server capacity increases (e.g., as the content size gets bigger and/or the number of requests to the content increase), meeting that demand by increasing capacity is often very expensive, requiring a larger number of servers or more powerful servers to be deployed.

Server owners typically have a financial arrangement/peering agreement with one or Internet service provider (ISP)s. Server owners pay ISPs for network access, e.g., based on long term usage based accounting (e.g., throughput). Thus, as the amount of content served by the servers increases, the bandwidth cost incurred also increases. Additionally, server-based solutions typically have little insight into or control over how their content propagates through various networks.

Another way that content can be distributed is through use of peer-to-peer (P2P) systems. In a typical P2P scenario, a node downloads content from the system, and also uploads content to other nodes. In a hybrid content distribution system, a fraction of the content is transmitted by the servers and the rest is transmitted by nodes using their uplink capacity. Unfortunately, ISPs are facing increased network congestion (and no corresponding increase in revenue) from P2P and hybrid content distributions. When P2P and hybrid systems exploit the uplink capacity of an ISP network to distribute content, they typically utilize that uplink capacity (including off-net capacity of an ISP network) without the permission of the ISP network. Additionally, P2P and hybrid systems do not control the amount of capacity they consume in the bottleneck links in the ISP network, including the amount of off-net traffic generated by the systems. The off-net traffic traverses the links that connect the ISP to other ISPs, which are usually among the most expensive links for an ISP.

Therefore, it would be desirable to have a better way to account for content distribution.

BRIEF DESCRIPTION OF THE DRAWINGS

Various embodiments of the invention are disclosed in the following detailed description and the accompanying drawings.

FIG. 5 is an illustration of an example network component record.

FIG. 7 illustrates examples of queries.

DETAILED DESCRIPTION

The invention can be implemented in numerous ways, including as a process, an apparatus, a system, a composition of matter, a computer readable medium such as a computer readable storage medium or a computer network wherein program instructions are sent over optical, wire, or wireless communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
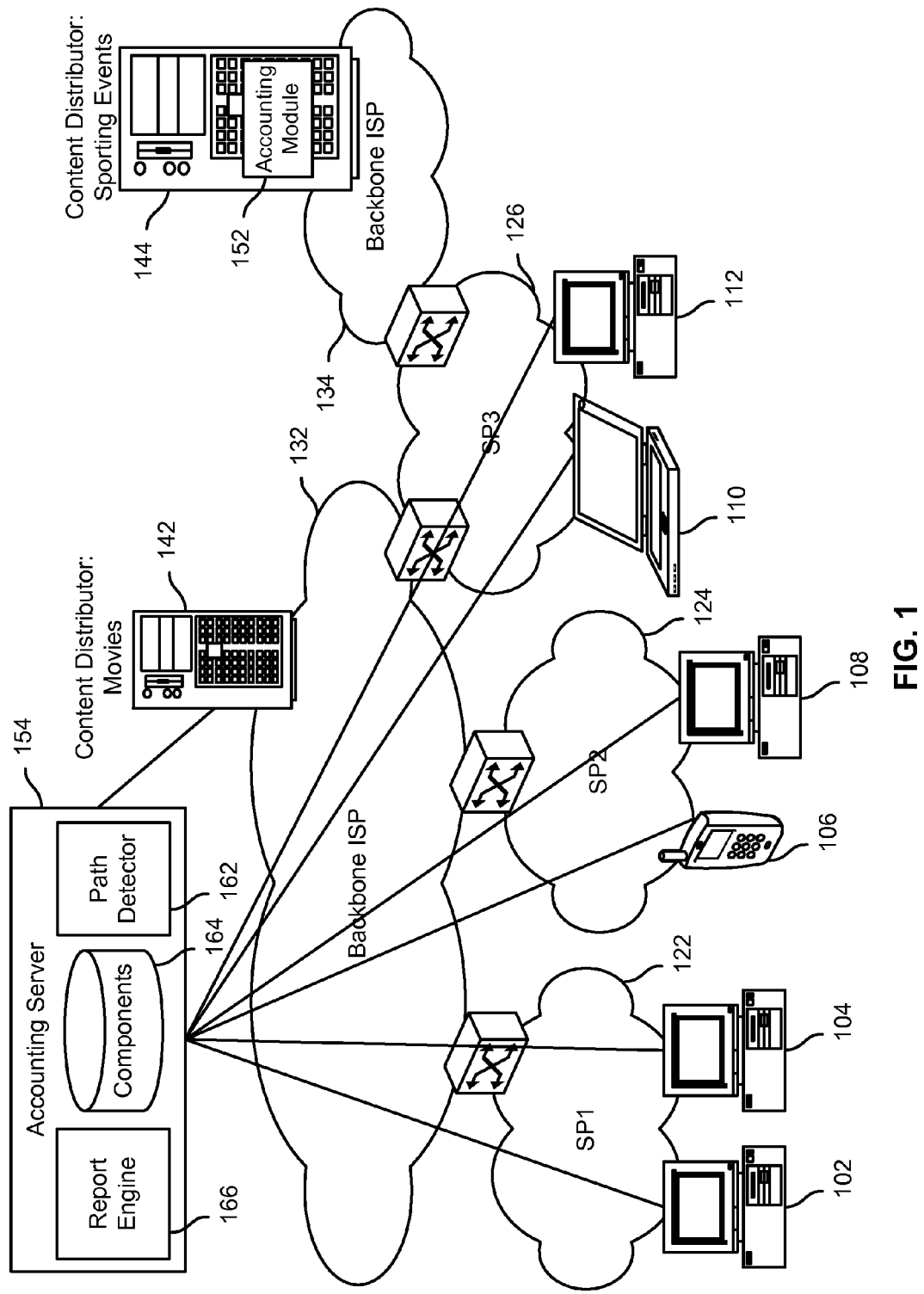
FIG. 1 is an illustration of an embodiment of a system that accounts for network traffic.

FIG. 1 is an illustration of an embodiment of a system that accounts for network traffic. In the example shown, clients 102-112 are used to access content, such as audiovisual content (e.g., movies, songs, television shows, sporting events, games, etc.) that is owned by content owners. Clients can include personal computers (102, 104, 108, 112), laptops (110), and cellular phones/personal digital assistants (106), as well as other types of information appliances (not shown) such as set-top boxes, game consoles, broadband routers, and digital video recorders, as applicable.

The clients shown are used by subscribers to various Internet service providers (ISPs). For example, clients 102 and 104 are subscribed to SP1 (122), while clients 106 and 108 are subscribed to SP2 (124) and clients 110 and 112 are subscribed to SP3 (126).

One typical goal of content owners is for their content to reach their customers (who likely subscribe to different networks) in an efficient, economic manner. In the example shown, a movie studio has contracted with content distributor 142 to provide downloadable copies of its films. Similarly, a soccer league has contracted with content distributor 144 to provide season pass holders with access to live streams of matches. Content distributor 142 has a data center that is provided with network access by backbone ISP 132. Though represented here by a single node (also referred to herein as a "CDN node"), content distributor 142 may typically have multiple data centers (not shown) and may make use of multiple backbone or other ISPs. Content distributor 144 has a data center that is provided with network access by backbone ISP 134.

In a traditional server-based content distribution arrangement, content distributors have financial arrangements/peering agreements with those ISPs with which their servers are directly connected. The traditional content distributor pays that ISP for network access, but does not pay any additional ISPs through which the content travels.

In a P2P or hybrid content distribution arrangement, content distribution systems utilize the uplink capacity of nodes in ISPs. However, they do not account or control the amount of capacity they consume in the bottleneck links in the ISP network, such as the amount of off-net traffic generated by the systems. In addition, the P2P or hybrid content distribution systems typically have no financial or other agreements with ISPs for utilizing their uplink capacity.

As described in more detail below, the techniques described herein can provide accounting for the propagation of content, including by providing visibility into how much bandwidth is being used by subscribers and groups of subscribers (e.g., on-net/off-net, broken across geography, peak usage times, subscriber ISP, etc.). The accounting is used in various embodiments to cause money to be paid to the network assets that are doing the propagating and/or to the content owners (e.g., by charging money or helping facilitate the payment of money), and is also used in various embodiments to enforce ISP policies, or a combination of those actions.

Accurate accounting can also allow for a variety of financial relationships with content owners or aggregators. For example, a content owner could opt to pay a content distributor a fixed (i.e., flat-rate) price as long as the content distributor delivers less than B bytes on its behalf, and pay per usage (e.g., at a higher rate) once threshold B is exceeded. Using the techniques described herein, the content owner could determine when it is approaching the threshold B, and/or receive a notification when threshold B is exceeded. The content owner could then determine how to address the situation, such as by deciding to reduce consumption by serving only its most important customers, throttling consumption to off-peak times, charging an additional fee of subscribers, etc.

In various embodiments, the infrastructure that provides network traffic accounting services is collocated on a single platform with a CDN node. Such is the case, for example, with the CDN node run by content distributor 144. That CDN node includes an accounting module 152. Network traffic accounting services may also be provided by a standalone platform and/or replicated across a plurality of servers. For example, content distributor 142 has a contractual arrangement with a third party wherein the third party provides network traffic accounting services to content distributor 142 via an accounting server 154. In such a case, the accounting server may be hosted by the same ISP as the CDN node or nodes that it provides accounting for, or it may be hosted by a different ISP or plurality of ISPs.

Network traffic accounting server 154 and network traffic accounting module 152 are referred to herein, collectively, as "accounting services." Portions of accounting services (e.g., database storage and retrieval) may be provided by and/or replicated across various other modules or infrastructure depending, for example, on factors such as scalability and availability (reducing the likelihood of having a single point of failure), and the techniques described herein may be adapted accordingly. In some embodiments the accounting service is implemented across a set of machines distributed among several data centers. In the example shown, accounting module 152 makes use of network-attached storage, while accounting server 154 makes use of storage collocated on that server. As described in more detail below, client software and/or software running on network devices such as switches augment the information available to accounting service.

Figure 2A:
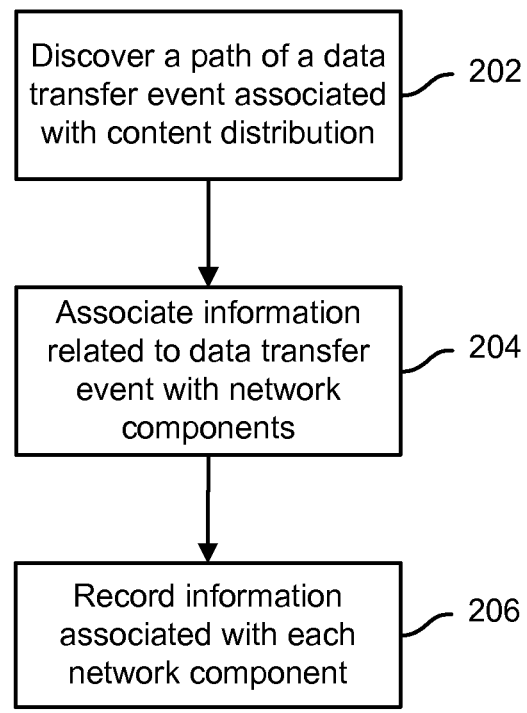
FIG. 2A is a flow chart illustrating an embodiment of a process for tracking the distribution of content.

FIG. 2A is a flow chart illustrating an embodiment of a process for tracking the distribution of content. In various embodiments, the process of FIG. 2 is implemented by accounting server 154 and/or accounting module 152. In some embodiments portions of the process shown in FIG. 2A are performed by clients that in turn share accounting information with an accounting service, as described in more detail below. The process begins at 202 when the path of a data transfer event associated with content distribution is discovered. A data transfer event is the transmission (e.g., from the CDN node to a client, or from one client to another) of a portion of content (e.g., a portion of a movie file as a packet or group of packets). The path typically includes a list of network components. In the example shown in FIG. 1, paths are discovered by path detector 162. In some embodiments, paths are or include subpaths or other portions of the path of the data transfer event. For example, in some cases a path is or includes a source and destination ISP. A path can also be or include a connection (e.g., a link) between one ISP and another, and/or an ISP in the path of transfer.

When network traffic travels from a source to a destination, it typically passes through several different logical and physical network components. In the Internet, an autonomous system (AS) is a collection of IP networks and routers under the control of one administrative entity (or sometimes more) that presents a common routing policy to the Internet. At a high level, the traffic passes from one AS to another. E.g., a movie file (and/or portions thereof) fetched by client 102 from content distributor 142 might traverse from the Backbone ISP through SP1 (each identified by an AS number) to reach client 102. That same traffic is logically routed through a plurality of layer 3 routing devices, and linked at the data layer through a plurality of switches (layer 1/layer 2). Examples of network components include each entity (e.g., the AS, the layer 3 router, and the layer 1/layer 2 switch) through which the data passes (or by which the data is routed). Other examples of network components include links, inter-AS links, geography (such as country, state, and city), and hosts (servers and/or clients).

In various embodiments, off-net traffic for an access ISP is included in accounting. An access ISP connects directly to subscribers. The off-net traffic traverses the links that connect the access ISP to other ISPs. In some cases, this can be inferred based only on the information provided by the software running on the sending and/or receiving nodes. For example, based on the source and destination IP addresses of a packet, the source and destination ISPs can be inferred. If the source and destination ISPs are the same, the packet stays at the same ISP. Otherwise, the packet traverses between two different ISPs.

In some cases, the path can be inferred based on tools such BGP peering and traceroute. In other cases, such as where ISPs provide insight into their networks (e.g., to help prevent internal bottlenecks), the path may be discovered at least in part based on information received from a third party or other outside source. In various embodiments, client software and/or software running on network devices such as switches augment the information used to discover the path. For example, a client behind a NAT or firewall may be able to provide additional insight not visible with a tool such as traceroute.

In some embodiments, the path discovered at 202 includes the identification of network components having a common level of granularity. For example, if BGP peering is used, the path discovered at 202 likely includes AS components (e.g., a path from AS1 to AS2), but does not contain router or switch information. Similarly, if traceroute is used, the network components are likely to include several routing devices but will not include other types of components. In some cases, the discovered path is augmented by other inferred information. For example, a traceroute often reveals geographical information in the name of the routing device (e.g., SanJose.ISP.com and nyc.he.net).

At 204 information related to the data transfer event is associated with the network components. Examples of information include the detected path, the owner of the content, the number of bytes transferred, the time of the start of the transfer, the time of the end of the transfer, the maximum data transmission rate of the event, the average rate of the transmission, and the title of the content. The level of detail of information can vary. For example, in some cases the information may include noting that an event has occurred but little else. In other cases, such as when the content distributor has or provides access to a backend database of meta-information associated with the content, more detailed information (e.g., artist name) may be included.

At 206, information associated with each network component is recorded. For example, suppose the path detected at 202 is at a very high level, and includes only ASes. Now suppose that 20 kilobytes are passed from backbone ISP 132 to ISP 122. The details of that data transfer event (e.g., that backbone ISP 132 passed 20 kilobytes to ISP 122 at 15:40 on July 20, that the kilobytes were a portion of the movie, Robin Hood, that the movie is owned by Acme studios, etc.) might all be recorded at 206. The level of detail recorded can vary. For example, a simple counter may be incremented each time a data event associated with that network component occurs, and/or a counter of the number of bytes transferred to/from that component might be incremented, without capturing more detailed information.

As described in more detail below, the information recorded at 206 can be mined or queried to obtain accounting information. Typically, accounting refers to measuring the traffic volume or the number of data items transferred over different spatial and time granularities. Examples include measuring the content distributor's traffic traversing a peering link at peak hours, the traffic generated by a particular content provider traversing a peering link over one month, and the content distributor's traffic entering a service provider network daily.

In the example shown in FIG. 1, the information recorded at 206 is stored by component database 164. Other mechanisms may also be used to store the information in addition to or instead of component database 164, such as an indexed file system (e.g., Btrieve). In some embodiments the accounting server creates an object, called an accounting object, for each piece of information that needs to be measured (e.g., the information obtained at 204). The accounting server maintains a two-way association between each accounting object and each entity (e.g., clients, links, set of clients or links) that sends/receives/carries the data measured by the accounting object. For example, the accounting object measuring the content distributor's traffic along a peering link is associated with that peering link, while the accounting object measuring the content distributor's traffic from SP1 (122) to SP2 (124) is associated with the set of all peering links between SP1 and SP2.

As described in more detail below, the set of entities in database 164 may change when a new client subscribes (i.e., joins the system for the first time) or unsubscribes, and when the network topology (e.g., the AS topology) changes. The set of accounting objects typically changes when a new contract is signed or renegotiated with a service provider or a content provider.

Figure 2B:
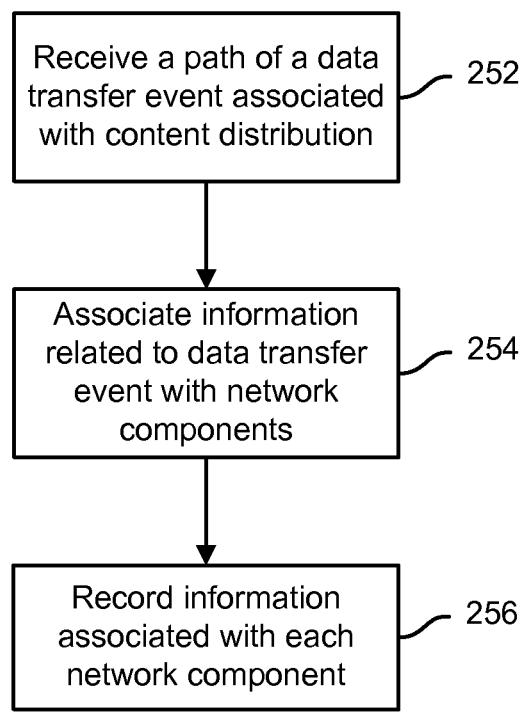
FIG. 2B is a flow chart illustrating an embodiment of a process for tracking the distribution of content.

FIG. 2B is a flow chart illustrating an embodiment of a process for tracking the distribution of content. In some embodiments the process shown in FIG. 2B is implemented by accounting server 154. In this example, an agent resident on a client determines the data transfer path and transmits that information to an accounting service such as accounting server 154. The process begins when the agent transmits the detected path to the accounting server, which receives it at 252. At 254, information related to the data transfer event associated with the network components is received, also from the agent, and/or from another source such as a CDN node. At 256, information associated with each network component is recorded, such as occurs at 206 in the process shown in FIG. 2A.

Figure 3A:
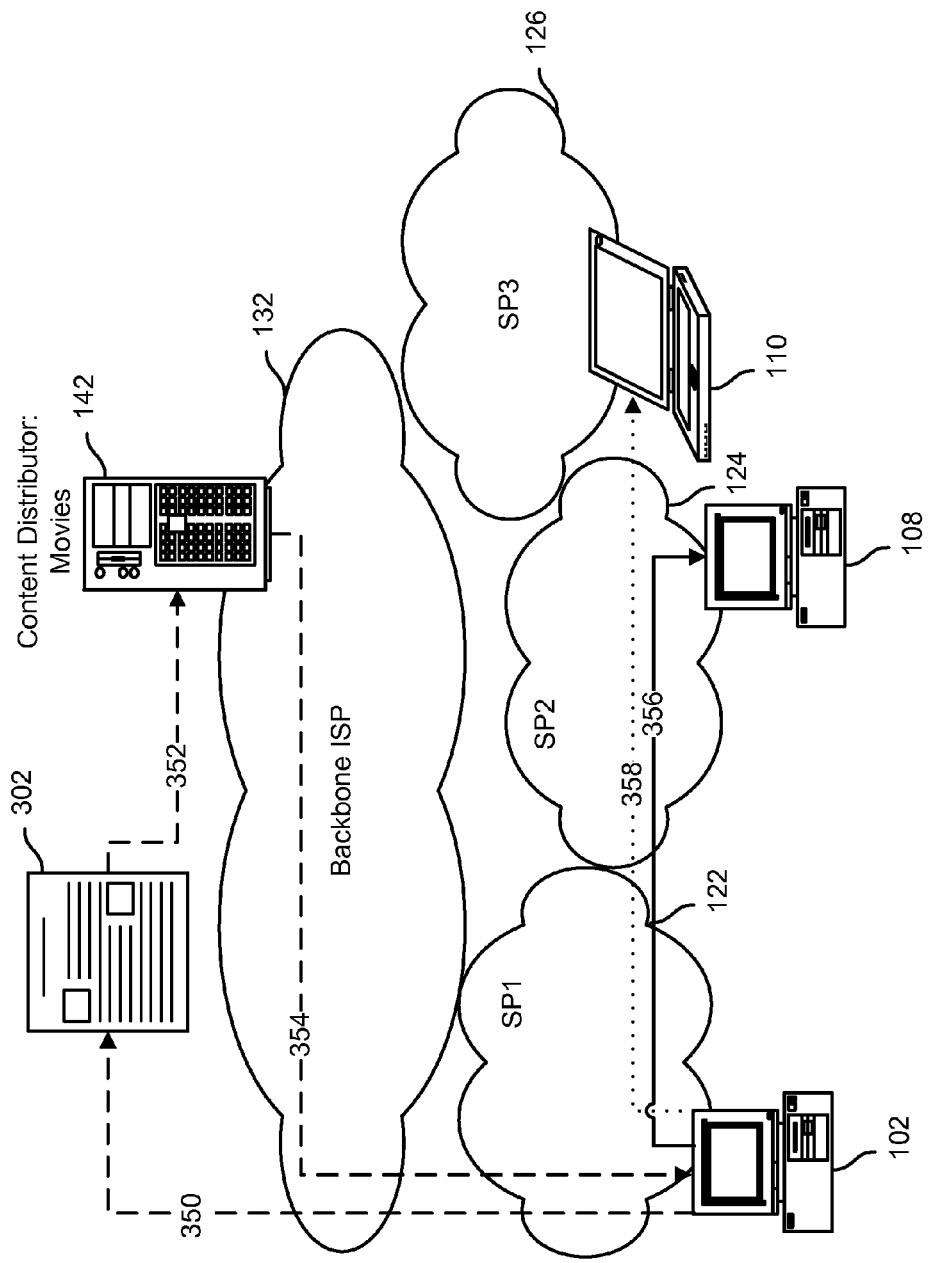
FIG. 3A illustrates an example of a network through which content is distributed.

FIG. 3A illustrates an example of a network through which content is distributed. In the example shown, a subscriber (via client 102) desires to download the movie, Robin Hood. The client contacts (350) the movie studio's web page (302) and is redirected (via an HTTP redirect) to content hosted by content distributor 142 (352). In various embodiments, a download coordinator (not shown) facilitates the directing of clients to one or more appropriate sources of content or portions of the content. For example, instead of being directed to the content distributor's CDN node, the client might be directed to obtain at least a portion of the content from another client, or from a plurality of sources.

While client 102 is downloading the film from content distributor 142 (354), clients 108 and 110 similarly visit page 302 to request the content. In this example, they are directed to fetch portions of the content from client 102, rather than downloading the entire content from content distributor 142. Client 102 accordingly sends portions of the content to client 108 (356) and client 110 (358). In various embodiments, permission to use a portion of a client's upload capacity is obtained. For example, service provider networks may indicate a grant of permission to the content delivery network to use a client's upload capacity through a partnership agreement, through client software, etc.

Each of the lines 354, 356, and 358 represents a data transfer event. In the example shown, suppose the processing at portion 202 of FIG. 2 was employed and BGP peering was used to discover the paths associated with each of those events. The first path (354) would indicate backbone ISP 132 and SP1 (122) as being the network components in that path. Similarly, the second path would indicate SP1 (122) and SP2 (124) as the network components, and the third path would indicate SP1 (122), SP2 (124), and SP3 (126) as the network components. In this example, only relatively coarse information is known about the network components, and accounting might be correspondingly coarse. In this example, no cooperation is provided on the part of an ISP.

Figure 3B:
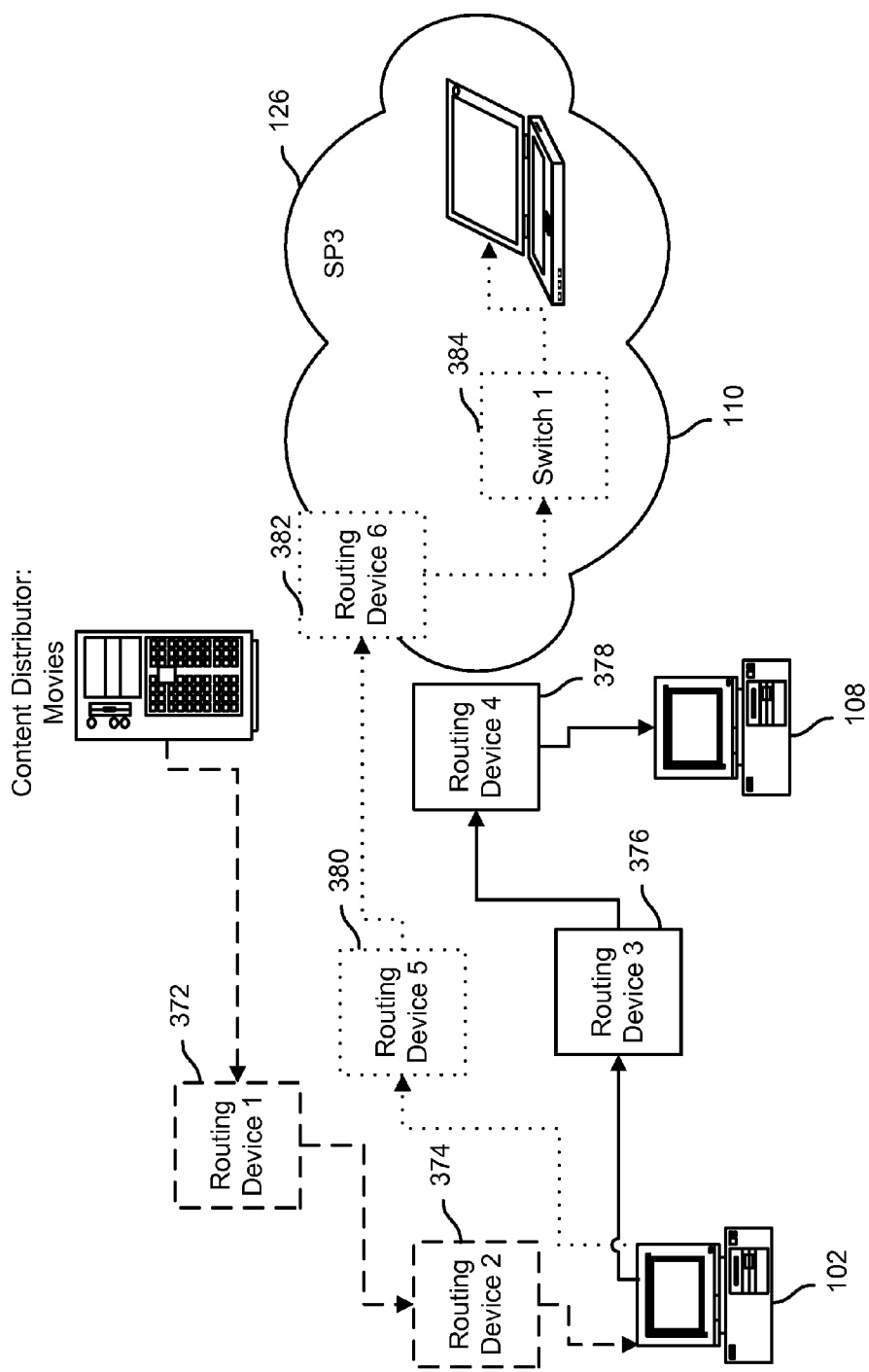
FIG. 3B illustrates an example of a network through which content is distributed.

FIG. 3B illustrates an example of a network through which content is distributed. The example shown represents a similar scenario to that presented in FIG. 3A. However, in this example, rather than using BGP peering to discover the paths associated with each of the transfer events, traceroute is used. Now the first path indicates that routing device 1 (372) and routing device 2 (374) are the network components in that path. Similarly, the second path indicates routing device 3 (376) and routing device 4 (378) as the network components, and the third path indicates routing device 5 (380) and routing device 6 (382) as the network components. Additionally, in the example shown, SP3 (126) has provided additional visibility to the accounting server in the form of indicating switch 1 (384) as a network component.

In this example, more refined information is known about the network components, and accounting might be accordingly refined. As described in more detail below, in some embodiments accounting services maintain a list of known network components and maintain a mapping between the identity of each such device and who owns the device (and/or provides it with bandwidth). As such, the owner of those network devices can be compensated for use of their infrastructure/bandwidth.

Figure 4:
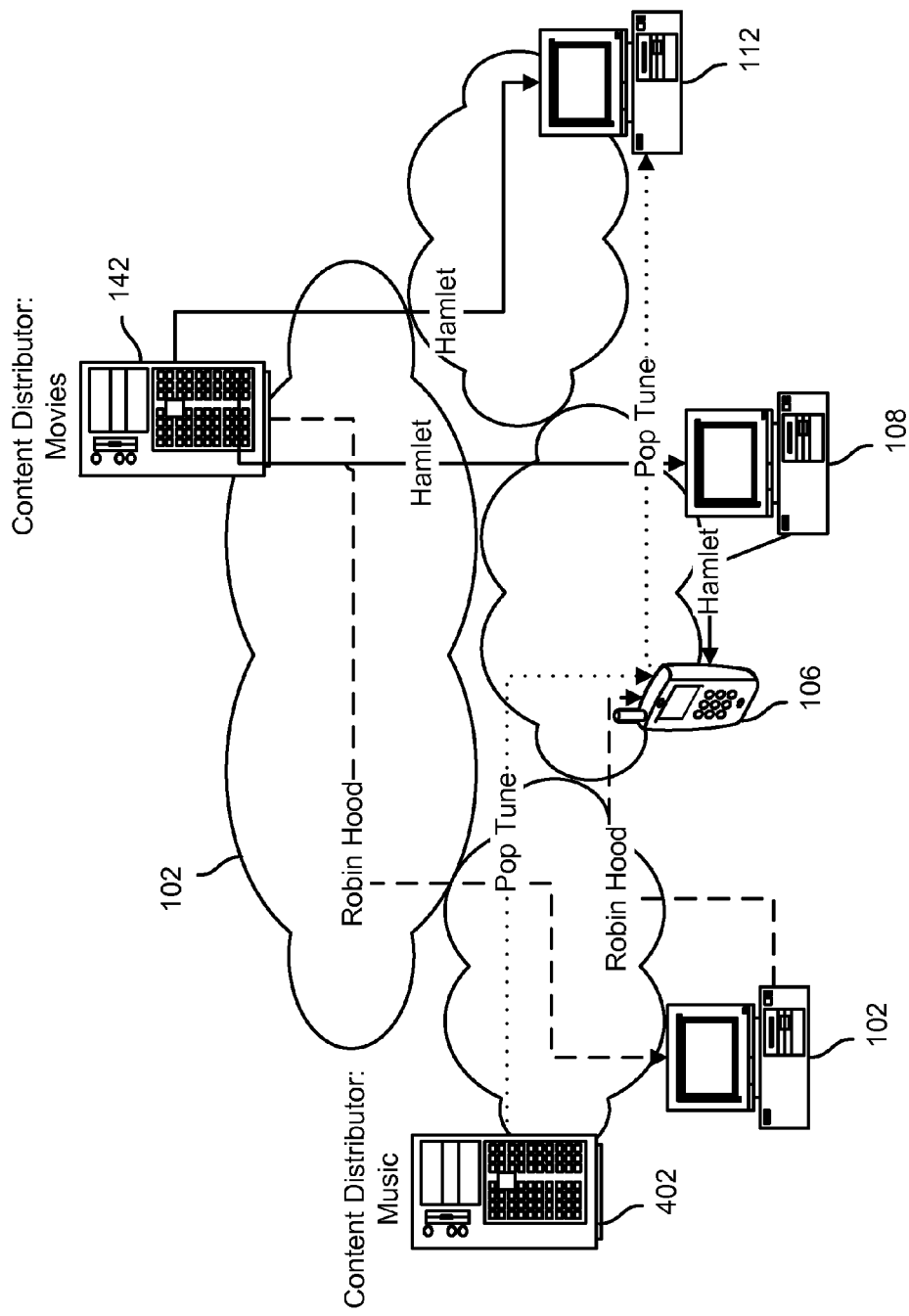
FIG. 4 illustrates an example of a network through which content is distributed.

FIG. 4 illustrates an example of a network through which content is distributed. The example shown represents a scenario in which content distributor 142 is seeding multiple pieces of content to clients and where content distributor 402 is also seeding content to clients. In the example shown, client 102 is downloading the movie Robin Hood from content distributor 142 and is uploading portions of that movie to client 106. Clients 108 and 112 are both downloading copies of Hamlet from content distributor 142. Client 108 is uploading portions of Hamlet to client 106. In the example shown, the communication between clients 102 and 106 is "off net." The communication between clients 108 and 106 is "on net."

Meanwhile, content distributor 402 is seeding a song to client 106, which is in turn seeding the song to client 112. It is likely that the song ("Pop Tune") being transmitted requires significantly less bandwidth than either of the movie files. Using the techniques described herein, the content distributors can correctly apportion that network traffic attributable to a particular content owner as that content traverses multiple networks. Similarly, royalties can be determined (e.g., based on total number of times the song is sent from a source to a destination) irrespective of whether the download occurs directly from a CDN (402) or from another client (e.g., 106).

FIG. 5 is an illustration of an example network component record. As described above, in some embodiments accounting services such as accounting server 154 maintain a database of network components (e.g., in component database 164). In the example shown, every time a data transfer event occurs, a record corresponding with the associated network component is created in component database 164. Records are in the form shown at 502 and include an identifier of the component, along with the discovered path, owner of content, number of bytes transmitted, start and end times of the transfer, and the title of the content. A sample record is included at 504, wherein the path includes traceroute information.

Figure 6:
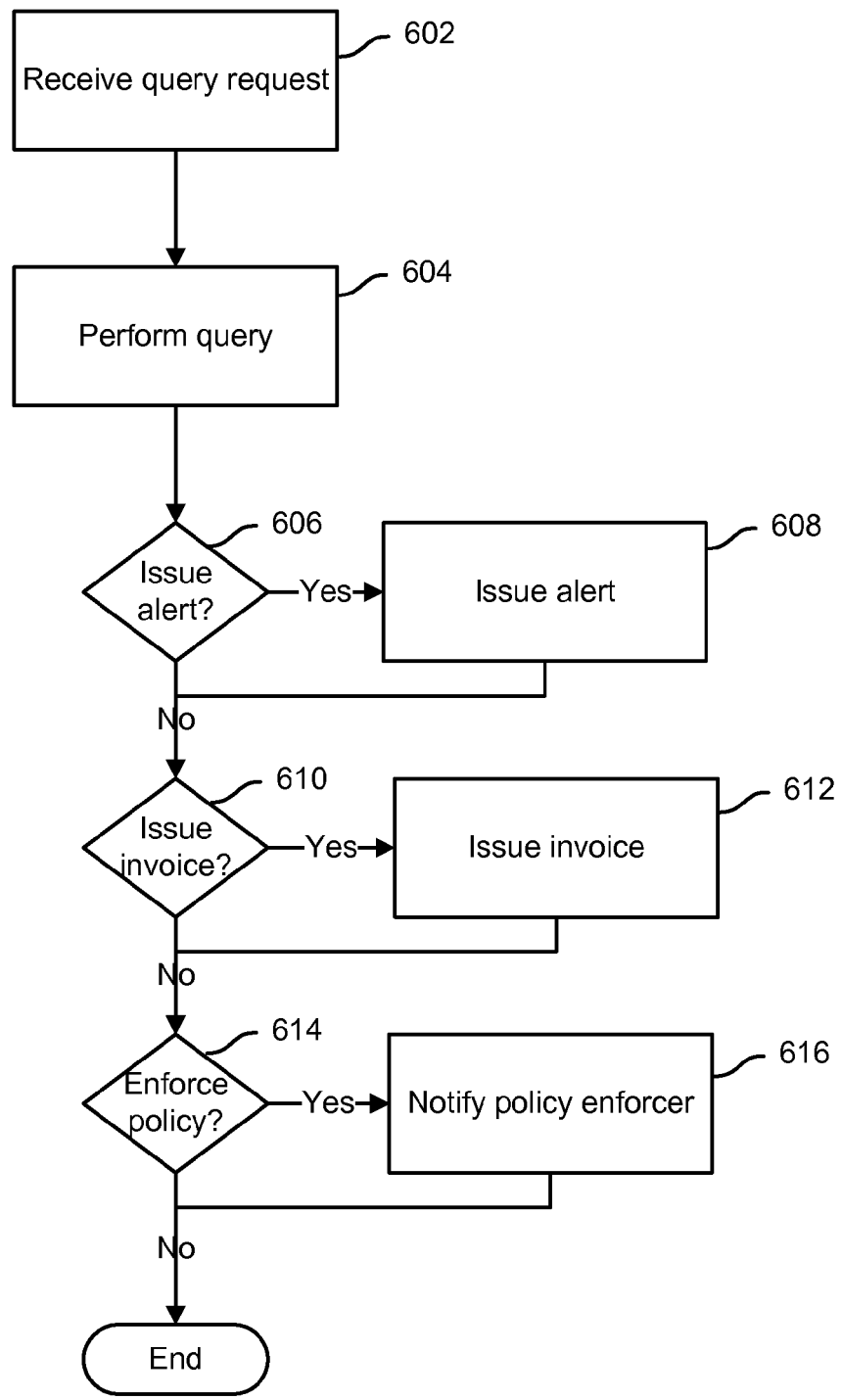
FIG. 6 is a flow chart illustrating an embodiment of a process for accounting for network traffic.

FIG. 6 is a flow chart illustrating an embodiment of a process for accounting for network traffic. In some embodiments the process is implemented by report engine 166 of the accounting server 154 shown in FIG. 1. The process beings at 602 when a request to perform a query of the information in component database 164 is received. In various embodiments other data structures may be used to analyze the collected information associated with data transfer events, as applicable. In some cases queries are manually triggered, e.g., by an administrator entering a query by hand, selecting a query from a console, or a content owner making use of an interface to accounting server 154. In other cases queries are at least sometimes automated, such as being run as nightly or weekly cron jobs. Queries are received from a console or from a batch, as applicable.

At 604 the query is performed, for example, against database 154. Conceptual samples of queries are provided below. Based on the results of the query, a variety of actions can be taken. For example, at 606 it is determined whether to issue an alert based on the results of the query. Such may be the case for example, if a content owner has requested to be alerted whenever bandwidth usage over a certain time period exceeds some threshold value (or dips below a certain value). If applicable, an alert is issued at 608.

At 610 it is determined whether to issue an invoice based on the results of the query. Such may be the case, for example, if the query is performed as part of a month-end or quarter-end settle up period in which content owners pay each of the network providers through whose networks the content owner's content traversed. For example, at 612, SP1, SP2, and SP3 might each cause invoices to be generated that request payment from a content owner.

At 614 it is determined whether or not to enforce a policy based on the results of the query. In various embodiments, a download coordinator directs clients to particular sources of content (e.g., selecting peers to send/receive content) based on policies. One example of a policy type is a network capacity policy (e.g., how much traffic flow is assigned a certain link, whether a peering link or an internal link. Suppose, for example, that for a particular peering link, SP2 does not want the sporting event content to exceed certain capacity. If it is determined (e.g., by a query at 604) that that capacity has been exceeded, at 614 the determination is made to enforce the appropriate policy (616). Another example of a policy is that SP3 does not want aggregate video traffic (including both live events like the sporting event and files such as the movie) to exceed a certain amount. Another example of a policy is that SP1, aware of a bottleneck within its network, imposes limits on video traffic along an internal link. In some embodiments the coordinator is a logical concept and is implemented in a distributed fashion.

FIG. 7 illustrates examples of queries. In some embodiments report engine 166 is configured to perform the queries shown. Query 702 is a request for the total number of bytes that were sent from SP1 to SP2 between six at night and midnight. Query 704 is a request for the total number of bytes associated with the content owner, MovieStudio, that leave SP1 and enter SP2. Query 706 is a request for the total number of bytes associated with the content owner, MovieStudio, that are delivered to subscribers of SP1. Rather than seeking a total number of bytes, query 708 is a request for the number of files associated with the content owner, MovieStudio that were received by a particular node. Query 710 requests the difference in traffic between two ISPs, SP1 and SP2. Such a query might be used at the end of the month or the end of the quarter to determine whether one ISP owes the other any money.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, including:
   a set of one or more processors configured to:
   discover a path of a data transfer event associated with a distribution of content, wherein the path of transfer includes a plurality of network components through which at least a portion of the content was propagated, wherein discovering the path of transfer includes inferring at least some of the plurality of network components, and wherein inferring the at least some of the plurality of network components includes inferring source and destination Internet service providers based at least in part on source and destination IP addresses;
   determine whether the at least portion of the content has traversed between different Internet service providers based at least in part on the source and destination Internet service providers inferred based at least in part on the source and destination IP addresses;
   for each network component in the plurality of network components, associate a given network component with information related to the data transfer event; and
   record the information associated with each network component in the plurality of network components; and
   a memory coupled to the set of one or more processors and configured to provide the set one or more processors with instructions.

2. The system of claim 1 wherein the set of one or more processors is further configured to determine a fee associated with each of the network components.

3. The system of claim 2 wherein the set of one or more processors is further configured to aggregate the fees from network components for a network owner.

4. The system of claim 1 wherein recording includes incrementing the number of bytes processed by a network component.

5. The system of claim 1 wherein recording includes aggregating the number of bytes processed by a network component for a plurality of content providers.

6. The system of claim 1 wherein recording includes logging at least a portion of the associated information.

7. The system of claim 1 wherein the information includes the content provider associated with the transfer.

8. The system of claim 1 wherein the information includes the type of transfer.

9. The system of claim 1 wherein the information includes the time of transfer.

10. The system of claim 1 wherein the information includes geography.

11. The system of claim 1 wherein at least one network component in the plurality of network components is: an autonomous system, a router, a link level switch, a peering link, or a host.

12. The system of claim 11 wherein the host includes a server or a client.

13. The system of claim 1 wherein the path is discovered at least in part by a content receiving node reporting the path to a distribution server.

14. The system of claim 1 wherein the path is discovered at least in part by tracing a route at a content receiving node.

15. The system of claim 1 wherein the path is discovered at least in part by tracing a route at a content source.

16. The system of claim 1 wherein the path is discovered at least in part by using routing protocol information.

17. The system of claim 1 wherein the granularity of the path of transfer includes autonomous systems.

18. The system of claim 1 wherein the granularity of the path of transfer includes routers.

19. The system of claim 1 wherein the granularity of the path of transfer includes switches.

20. The system of claim 1 wherein the path is a subpath.

21. The system of claim 1 wherein the path is discovered by client software.

22. The system of claim 1 wherein the path includes a link that connects two Internet services providers.

23. The system of claim 1 wherein the path of transfer includes a plurality of networks controlled by a plurality of parties.

24. The system of claim 1 wherein inferring the at least some of the plurality of network components is based at least in part on at least one of BGP peering and traceroute.

25. A method, including:
    discovering, using a set of one or more processors, a path of a data transfer event associated with a distribution of content, wherein the path of transfer includes a plurality of network components through which at least a portion of the content was propagated, wherein discovering the path of transfer includes inferring at least some of the plurality of network components, and wherein inferring the at least some of the plurality of network components includes inferring source and destination Internet service providers based at least in part on source and destination IP addresses;
    determining whether the at least portion of the content has traversed between different Internet service providers based at least in part on the source and destination Internet service providers inferred based at least in part on the source and destination IP addresses;
    for each network component in the plurality of inferred network components, associating a given network component with information related to the data transfer event; and
    recording the information associated with each network component in the plurality of network components.

26. The method of claim 25 further comprising determining a fee associated with each of the network components.

27. The method of claim 26 further comprising aggregating the fees from network components for a network owner.

28. The method of claim 25 wherein recording includes incrementing the number of bytes processed by a network component.

29. The method of claim 25 wherein recording includes aggregating the number of bytes processed by a network component for a plurality of content providers.

30. The method of claim 25 wherein recording includes logging at least a portion of the associated information.

31. The method of claim 25 wherein the information includes the content provider associated with the transfer.

32. The method of claim 25 wherein the information includes the type of transfer.

33. The method of claim 25 wherein the information includes the time of transfer.

34. The method of claim 25 wherein the information includes geography.

35. The method of claim 25 wherein at least one network component in the plurality of network components is: an autonomous system, a router, a link level switch, a peering link, or a host.

36. The method of claim 35 wherein the host includes a server or a client.

37. The method of claim 25 wherein the path is discovered at least in part by a content receiving node reporting the path to a distribution server.

38. The method of claim 25 wherein the path is discovered at least in part by tracing a route at a content receiving node.

39. The method of claim 25 wherein the path is discovered at least in part by tracing a route at a content source.

40. The method of claim 25 wherein the path is discovered at least in part by using routing protocol information.

41. The method of claim 25 wherein the granularity of the path of transfer includes autonomous systems.

42. The method of claim 25 wherein the granularity of the path of transfer includes routers.

43. The method of claim 25 wherein the granularity of the path of transfer includes switches.

44. The method of claim 25 wherein the path is a subpath.

45. The method of claim 25 wherein the path is discovered by client software.

46. The method of claim 25 wherein the path includes a link that connects two Internet services providers.

47. The method of claim 25 wherein the path of transfer includes a plurality of networks controlled by a plurality of parties.

48. The method of claim 25 wherein inferring the at least some of the plurality of network components is based at least in part on at least one of BGP peering and traceroute.

49. A computer program product embodied in a non-transitory computer readable storage medium and comprising computer instructions for:
  discovering, using a set of one or more processors, a path of a data transfer event associated with a distribution of content, wherein the path of transfer includes a plurality of network components through which at least a portion of the content was propagated, wherein discovering the path of transfer includes inferring at least some of the plurality of network components, and wherein inferring the at least some of the plurality of network components includes inferring source and destination Internet service providers based at least in part on source and destination IP addresses;
  determining whether the at least portion of the content has traversed between different Internet service providers based at least in part on the source and destination Internet service providers inferred based at least in part on the source and destination IP addresses;
  for each network component in the plurality of network components, associating a given network component with information related to the data transfer event; and
  recording the information associated with each network component in the plurality of network components.

50. The computer program product of claim 49 further comprising computer instructions for determining a fee associated with each of the network components.

51. The computer program product of claim 50 further comprising computer instructions for aggregating the fees from network components for a network owner.

52. The computer program product of claim 49 wherein recording includes incrementing the number of bytes processed by a network component.

53. The computer program product of claim 49 wherein recording includes aggregating the number of bytes processed by a network component for a plurality of content providers.

54. The computer program product of claim 49 wherein recording includes logging at least a portion of the associated information.

55. The computer program product of claim 49 wherein the information includes the content provider associated with the transfer.

56. The computer program product of claim 49 wherein the information includes the type of transfer.

57. The computer program product of claim 49 wherein the information includes the time of transfer.

58. The computer program product of claim 49 wherein the information includes geography.

59. The computer program product of claim 49 wherein at least one network component in the plurality of network components is: an autonomous system, a router, a link level switch, a peering link, or a host.

60. The computer program product of claim 59 wherein the host includes a server or a client.

61. The computer program product of claim 49 wherein the path is discovered at least in part by a content receiving node reporting the path to a distribution server.

62. The computer program product of claim 49 wherein the path is discovered at least in part by tracing a route at a content receiving node.

63. The computer program product of claim 49 wherein the path is discovered at least in part by tracing a route at a content source.

64. The computer program product of claim 49 wherein the path is discovered at least in part by using routing protocol information.

65. The computer program product of claim 49 wherein the granularity of the path of transfer includes autonomous systems.

66. The computer program product of claim 49 wherein the granularity of the path of transfer includes routers.

67. The computer program product of claim 49 wherein the granularity of the path of transfer includes switches.

68. The computer program product of claim 49 wherein the path is a subpath.

69. The computer program product of claim 49 wherein the path is discovered by client software.

70. The computer program product of claim 49 wherein the path includes a link that connects two Internet services providers.

71. The computer program product of claim 49 wherein the path of transfer includes a plurality of networks controlled by a plurality of parties.

72. The computer program product of claim 49 wherein inferring the at least some of the plurality of network components is based at least in part on at least one of BGP peering and traceroute.

* * * * *